May 24, 1932.  G. E. NICHOLS  1,859,711

HAULING DEVICE

Filed March 31, 1930

Inventor
George E. Nichols

By Cushman, Darby
Attorneys

Patented May 24, 1932

1,859,711

UNITED STATES PATENT OFFICE

GEORGE E. NICHOLS, OF ABBEVILLE, ALABAMA, ASSIGNOR, BY DIRECT AND MESNE ASSIGNMENTS, TO THE WONDER SKIDDER COMPANY, INC., OF ABBEVILLE, ALABAMA, A CORPORATION OF ALABAMA

HAULING DEVICE

Application filed March 31, 1930. Serial No. 440,351.

The invention relates to a hauling device to be attached to and used in connection with the ordinary motor vehicle truck.

The object of the invention is to provide a hauling device which is portable and may be quickly and easily attached to or detached from any motor truck without alteration thereto.

Another object of the invention is to provide a hauling device which derives its power from the traction wheels of the motor truck without installation of driving connections between the truck wheels and the hauling device.

Another object of the invention is to provide a hauling device which is adapted to exert a slow and powerful pull or a fast and less powerful pull.

Still another object of the invention is to provide a hauling device which is simple and sturdy in construction, efficient in operation, lasting in quality, and comparatively inexpensive to manufacture.

With these and other objects and advantages in mind, attention is called to the drawings, in which.

Figure 1:
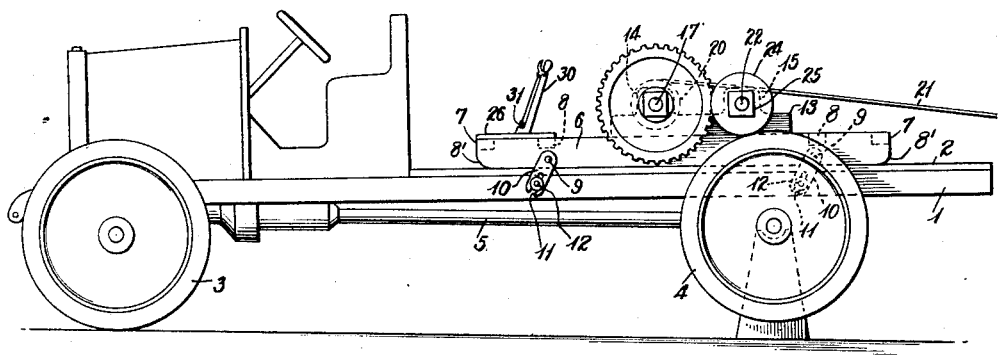
Figure 1 is a side view of the hauling device in operative position installed on the floor of an ordinary truck.
Figure 2:
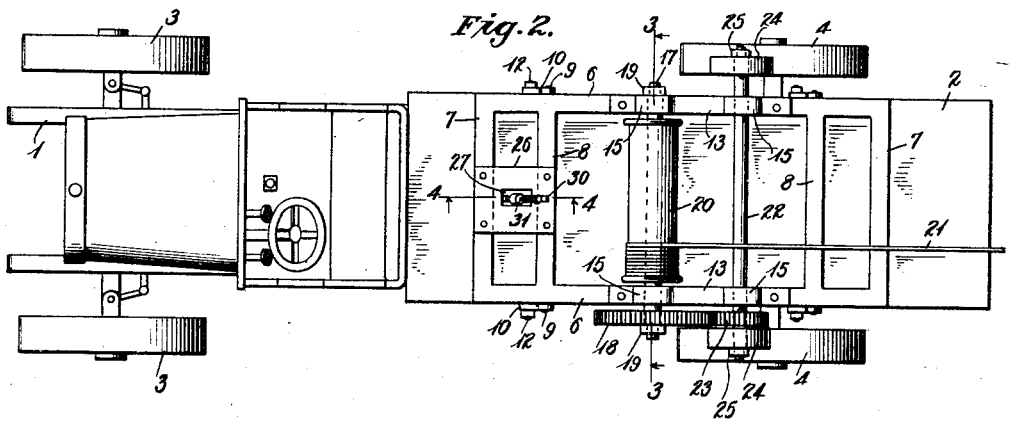
Figure 2 is a plan view of the hauling device as shown in Figure 1.
Figure 3:
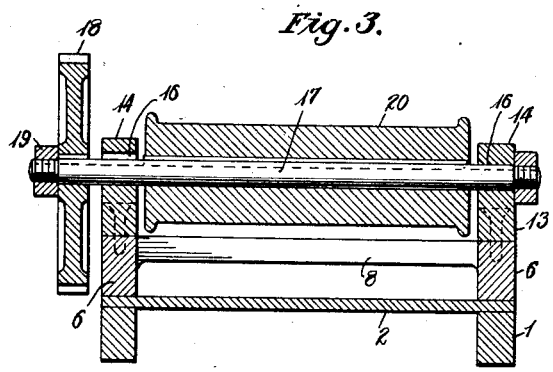
Figure 3 is a sectional view of the winding drum of the hauling device taken on the line 3—3 of Figure 2.
Figure 4:
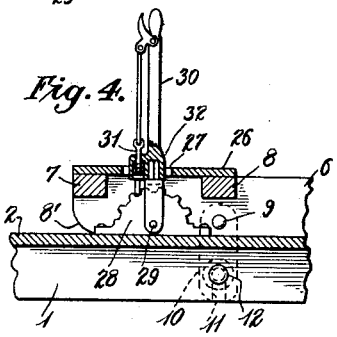
Figure 4 is a sectional view of the means for shifting the hauling device into and out of operative engagement with the traction wheels of the truck, taken on the line 4—4 of Figure 2.

Referring more specifically to the drawings, in which like numbers indicate like parts, 1 is the frame and 2 is the floor of an ordinary truck having front wheels 3 and rear driving wheels 4 and a driving shaft 5 from the motor to the rear wheels.

The hauling device which forms my invention comprises a frame approximately the width of the floor of the truck having sides 6, ends 7, and provided with cross bars 8, all of which are preferably cast, although the parts named may be joined to each other in any of the well-known ways. It will be noted that the ends of the sides 6 are rounded off as at 8', the purpose of which will be later explained.

Pivotally attached to both sides of the frame near the ends thereof, by any well-known means, such as a bolt 9, are strap like metallic members 10 having at their lower ends slots 11. When the frame of the hauling device has been correctly positioned on the floor of a truck, the slots 11 will cooperate with the bolts 12 attached to the sides of the truck frame and prevent any lateral movement but will allow longitudinal movement of the hauling device.

Mounted on top of both sides of the frame of the hauling device in any suitable manner are members 13 provided with two upward projections 14 and 15 having holes 16 therein to accommodate the shafts of the hauling mechanism.

In the holes of the front projections 14 is mounted for rotation a shaft 17 provided at one end with a gear wheel 18 feathered to said shaft, which is held against displacement in any suitable manner, such as by nuts 19. Feathered to this shaft 17 and movable therefrom is a winding drum 20 with cable 21.

In the holes of the rear projections 15 is mounted for rotation a shaft 22 provided at one end with a gear wheel 23 which meshes with the gear wheel 18, and at both ends with flat pulley wheels 24 feathered to said shaft and held against displacement in any suitable manner, as by nuts 25.

By removing the nuts or other means at either end of the shafts they may be withdrawn and the winding drum interchanged from one shaft to another, or larger or smaller gear wheels and pulleys may be attached as desired, to suit the purpose to which the device is applied.

At the front end of the hauling device there is provided the means for shifting the mechanism into and out of engagement with the traction wheels of the motor truck. Attached to the front end 7 and the front cross bar 8 is a plate 26 having a slot 27 therein. A ratchet 28 is bolted or otherwise attached to the floor of the truck and has pivotally and detachably secured thereto at 29 a handle 30 provided with a spring operated pawl 31 to cooperate with the ratchet, thereby holding the handle in a set position. The handle is enlarged at 32 to withstand the pressure exerted against the plate 26 when the handle is moved back and forth.

To install the hauling device it is necessary only to screw the bolts 12 at the proper distance on each side of the truck frame and to attach the ratchet 28 near the front end of and in a central position on the floor of the truck. Due to the fact that the ratchet is near the forward end of the truck floor it in many instances can be left permanently attached thereto as it is not likely to interfere in any use to which the truck is put when not carrying the hauling device. Likewise, the bolts on the sides of the truck frame need not be disturbed when once attached.

The hauling device is then secured upon the truck floor by the strap-like members 10 with the slots 11 engaging the bolts 12. The handle 30 is then dropped through the slot 27 in plate 26 and pivotally secured at 29 to the ratchet 28.

Due to the rounded off portions 8' of the ends of the sides 6 of the hauling device frame, it will easily move back and forth on the truck floor even though, through use, the truck floor may be rough and uneven.

The operation of the device after installation is extremely simple and may be accomplished either while the truck is jacked up in any well-known manner, as shown in Figure 1, or while the truck is moving under its own power. By simply operating the handle backwardly the flat pulley wheels will come into contact with the tires of the traction wheels of the truck and power will be transmitted through the gears to the winding drum and cable thereon. By simply operating the handle forwardly the flat pulley wheels are disconnected from the traction wheels of the truck and operation of the hauling device stops.

If a light load is to be hauled, the drum and cable may be transferred in a few minutes from shaft 17 to shaft 22 and in so doing great rapidity in hauling can be obtained, as the latter shaft revolves more quickly than the former shaft.

In order to accommodate differently sized traction wheels and tires on the motor truck, differently sized flat pulley wheels are provided for attachment to shaft 22, and it is of course, possible to obtain any gearing ratio desired between the two shafts 17 and 22.

Actual use of the hauling device under all kinds of conditions and in all kinds of operations has shown very successful results in that there is provided sufficient power to haul the heaviest of loads. Because of its portable nature and without the necessity of altering the motor truck in any way to be adapted to receive the hauling device, the invention fulfills a long felt need where devices of this type are necessary.

It is understood that the invention may be employed in many ways without departing from the spirit and scope of the appended claims.

What I claim is:

1. In combination with the driving means of a power device, a hauling device including a frame mounted on the power device, interconnected shafts journalled in said frame, a winding drum interchangeable between said shafts, and means for shifting the hauling device into and out of operative engagement with said driving means.

2. In combination with the driving means of a power device, a hauling device including a frame having a shaft journalled therein, a winding drum keyed to said shaft, a second shaft journalled in said frame and operatively connected to said first mentioned shaft, said second shaft having a driving member thereon adapted to engage said driving means, said winding drum being interchangeable between said shafts, and means for shifting said driving member into and out of engagement with said driving means.

3. In combination with the driving means of a power device, a hauling device including a frame slidably mounted on the power device, interconnected shafts mounted for rotation on said frame, a winding drum keyed to one of said shafts, one of said shafts having a driving member thereon arranged to engage said driving means, and a handle pivoted to said power device and operatively connected to said frame to shift the latter to move the driving member into and out of engagement with said driving means.

4. In combination with the driving means of a power device, a hauling device including a frame slidably mounted on the power device, interconnected shafts mounted for rotation on said frame, a winding drum keyed to one of said shafts, one of said shafts having a driving member thereon arranged to engage said driving means, and a handle pivoted to said power device and operatively connected to said frame to shift the latter to move the driving member into and out of engagement with said driving means, and means on the power device for maintaining the handle in a predetermined position.

5. In combination with the driving means of a power device, a hauling device including a frame slidably mounted on the power device, interconnected shafts mounted for rotation on said frame, and a winding drum keyed to one of said shafts, one of said shafts having a driving member thereon arranged to engage said driving means, a ratchet mounted on the power device, and a handle pivotally connected to the ratchet and having a pawl associated therewith, said handle being connected to the frame to shift the latter whereby to move the driving member into and out of engagement with said driving means.

6. In combination with a motor truck having traction wheels, a portable hauling device slidably mounted thereon, said device including a frame having interconnected shafts journalled therein, a winding drum arranged to be keyed to one of said shafts, driving members attached to the other of said shafts and arranged to engage the traction wheels of the motor truck, means for preventing lateral movement of the frame relative to the truck, and means for shifting the frame longitudinally of the truck whereby to move the driving members into and out of engagement with the traction wheels.

7. In combination with a motor truck having traction wheels, a portable hauling device slidably mounted thereon, said device including a frame having interconnected shafts journalled therein, a winding drum interchangeable between said shafts, driving members attached to the other of said shafts and arranged to engage the traction wheels of the motor truck, means for preventing lateral movement of the frame relative to the truck, and means for shifting the frame longitudinally of the truck whereby to move the driving members into and out of engagement with the traction wheels.

8. In combination with a motor truck having traction wheels, a portable hauling device mounted for lengthwise movement on the truck, said hauling device including a frame, interconnected shafts mounted for rotation on the frame, a winding drum, wheels attached to one of the shafts and arranged to engage the traction wheels of the truck, strap-like members pivotally attached to said frame and detachably secured to said motor truck to prevent lateral movement between the hauling device and the motor truck, and means for bodily moving the frame to shift said wheels into and out of engagement with the traction wheels of the motor truck.

9. In combination with a motor truck having traction wheels, a portable hauling device slidable longitudinally on the truck and including a frame, interconnected shafts journalled in the frame, a winding drum keyed to one of said shafts, driving members attached to the end of one of said shafts and arranged to engage the traction wheels of the motor truck, strap-like members attached to said frame to prevent lateral movement between the hauling device and the motor truck, and means moving the frame whereby to shift the driving members into and out of engagement with the traction wheels of the motor truck.

10. In combination with a motor truck having traction wheels, a frame slidably mounted on the truck, spaced shafts journalled in the frame, means operatively connecting the shafts to each other, a winding drum keyed to one of the shafts, driving members connected to the ends of the other of said shafts and arranged to engage the traction wheels of the motor truck, means to prevent lateral movement of the frame relative to the motor truck, and an operating handle pivoted to the truck and connected to the frame whereby to shift the driving members into and out of engagement with the traction wheels.

11. In combination with a motor truck having traction wheels, a frame slidably mounted thereon, interconnected shafts journalled in said frame, a winding drum interchangeable between said shafts, wheels attached to one of the shafts and arranged to engage the traction wheels of the motor truck, means to prevent lateral movement of the frame relative to the motor truck, a handle pivoted to the motor truck and connected with the frame to shift the wheels into and out of engagement with the traction wheels of the motor truck, and means for maintaining the handle in a predetermined position.

12. In combination with the driving means of a power device, a frame operatively associated with the power device and slidably mounted thereon, a drum revolubly mounted on the frame, means operatively connected to the drum and adapted to engage said driving means, and means for bodily moving said frame to move the drum into and out of operative engagement with said driving means.

13. In combination with a motor truck having traction wheels, a frame slidably mounted thereon, a winding drum revolubly mounted on the frame, means operatively connected to the drum and arranged to be moved into engagement with the traction wheels of the truck, and means for moving the frame relative to the truck body to shift the drum into and out of operative engagement with the traction wheels.

14. In combination with a motor truck having traction wheels and body, a frame mounted thereon, means for imparting longitudinal movement to the frame relative to the body, a winding member revolubly mounted on the frame, means operatively connecting the winding member to the traction wheels of the truck, and means for maintaining the frame in a predetermined position relative to the truck body.

15. In combination with a motor truck having traction wheels, a frame mounted for longitudinal movement on the truck, a winding drum revolubly mounted on the frame, a revolubly member operatively connected to the winding drum and arranged to be brought into operative engagement with the traction wheels, and means for bodily moving the frame relative to the truck to bring the revoluble member into and out of engagement with the said traction wheels.

In testimony whereof I have hereunto set my hand.

GEORGE E. NICHOLS.